United States Patent
Oshio (10) Patent No.: US 8,453,503 B2
(45) Date of Patent: Jun. 4, 2013

(54) VIBRATING REED, VIBRATOR, PHYSICAL QUANTITY SENSOR, AND ELECTRONIC APPARATUS

(75) Inventor: Masahiro Oshio, Shiojiri (JP)

(73) Assignee: Seiko Epson Corporation (JP)

( * ) Notice: Subject to any disclaimer, the term of this patent is extended or adjusted under 35 U.S.C. 154(b) by 265 days.

(21) Appl. No.: 12/964,016

(22) Filed: Dec. 9, 2010

(65) Prior Publication Data

US 2011/0138911 A1 Jun. 16, 2011

(30) Foreign Application Priority Data

Dec. 16, 2009 (JP) .................................. 2009-284875
Oct. 6, 2010 (JP) .................................. 2010-226379

(51) Int. Cl.
*G01C 19/56* (2012.01)

(52) U.S. Cl.
USPC ..................................... 73/504.12; 73/504.16

(58) Field of Classification Search
USPC . 73/504.12, 504.16, 504.15, 504.04; 310/370
See application file for complete search history.

(56) References Cited

U.S. PATENT DOCUMENTS

| | | | | |
|---|---|---|---|---|
| 5,166,571 A | * | 11/1992 | Konno et al. ................. | 310/333 |
| 5,585,561 A | * | 12/1996 | Bahl et al. ................... | 73/504.16 |
| 5,585,562 A | * | 12/1996 | Kurata et al. ............... | 73/504.16 |
| 5,763,781 A | * | 6/1998 | Netzer ......................... | 73/504.16 |
| 5,889,208 A | * | 3/1999 | Nose ........................... | 73/504.16 |
| 6,439,051 B2 | | 8/2002 | Kikuchi et al. | |
| 6,915,694 B2 | * | 7/2005 | Tomikawa et al. .......... | 73/504.16 |
| 2006/0162447 A1 | * | 7/2006 | Ogura ......................... | 73/504.12 |
| 2006/0201248 A1 | * | 9/2006 | Unno ........................... | 73/504.12 |
| 2009/0165554 A1 | * | 7/2009 | Noguchi et al. ............ | 73/504.12 |
| 2011/0162450 A1 | * | 7/2011 | Oshio ......................... | 73/504.12 |
| 2011/0226057 A1 | * | 9/2011 | Nishizawa .................. | 73/504.12 |
| 2011/0232383 A1 | * | 9/2011 | Shimura ...................... | 73/504.12 |
| 2012/0042728 A1 | * | 2/2012 | Hammer ...................... | 73/504.12 |

FOREIGN PATENT DOCUMENTS

| JP | 11-281372 | 10/1999 |
|---|---|---|
| JP | 2007-212355 | 8/2007 |

* cited by examiner

*Primary Examiner* — Helen Kwok
(74) *Attorney, Agent, or Firm* — Harness, Dickey & Pierce, P.L.C.

(57) ABSTRACT

A resonator element includes: drive beams including a first beam and a second beam that vibrate in torsional vibration modes and are elongated side by side in a first direction; support parts that couple one ends and the other ends of the first beam and the second beam; and detection arms elongated from the respective first beam and second beam in a second direction orthogonal to the first direction in a plan view, wherein, in a drive mode, the first beam and the second beam torsionally vibrate in opposite directions to each other, the respective detection arms vibrate in a normal direction of a plane containing the first direction and the second direction, and the detection arm elongated from the first beam and the detection arm elongated from the second beam vibrate in the same direction as each other.

7 Claims, 7 Drawing Sheets

L-L' SECTION    M-M' SECTION

FIG. 7C

L-L' SECTION    M-M' SECTION

VIBRATING REED, VIBRATOR, PHYSICAL QUANTITY SENSOR, AND ELECTRONIC APPARATUS

BACKGROUND

1. Technical Field

The present invention relates to a resonator element, a resonator, a physical quantity sensor such as an angular velocity sensor, and an electronic apparatus.

2. Related Art

Angular velocity sensors that detect rotational angular velocities are widely employed for navigation systems, attitude control systems of various kinds of apparatuses, image stabilizers of video cameras and digital cameras, etc. In the electronic apparatus, resonator element sensors that can be made compact are heavily used.

In related art, as an angular velocity sensor of a resonator element, a resonator including a vibration unit driven for driving and a vibrating and detection unit to detect detection vibration generated by rotation, the resonator detecting an angular velocity of a Z-axis rotational system in which plural vibration systems are formed to extend within a predetermined plane intersecting with the rotational axis Z is known (see Patent Document 1 (JP-A-11-281372)).

However, the angular velocity sensor of Patent Document 1 is a sensor that can detect vibration components of the vertical rotational axis, that is, the Z-axis rotational system, and it is necessary to mount the sensor vertically for the apparatus requiring plural detection axes and the sensor becomes larger as a sensor device.

Accordingly, as an angular velocity sensor that detects a rotational axis in parallel to the resonator surface, an angular velocity sensor that detects an angular velocity by allowing a detection unit continuously provided to a drive unit that drives in a torsional vibration mode around a torsion center axis intersecting with the rotational axis to perform torsionally rotational vibration and detect lateral flexural vibration of the detection unit generated by Coriolis force due to the rotational movement is known (see Patent Document 2 (JP-A-2007-212355)).

However, even by the above described angular velocity sensor according to Patent Document 2, detection accuracy may be reduced by generation of vibration leakage and output of signals not based on the angular velocity due to dimension accuracy of the resonator, so-called processing variations for vibrating detection arms provided at end parts in the Z direction by torsional vibration.

SUMMARY

An advantage of some aspects of the invention is to provide an angular velocity sensor (physical quantity sensor) with less vibration leakage and higher accuracy having a rotational axis within a plane of a resonator is provided.

Some aspects of the invention can solve at least a part of the problems described above and the invention can be implemented as the following forms or application examples.

APPLICATION EXAMPLE 1

This application example is directed to a resonator element that detects a rotational movement by an effect in response to Coriolis force generated by an angular velocity, including drive beams having a first beam and a second beam that vibrate in torsional vibration modes and provided so that the elongated direction may be in parallel, support parts that couple both ends of the first beam and the second beam, and one or more detection arms that extend from a side surface of the first beam and a side surface of the second beam in a direction away from the other beam and detect the rotational movement, wherein an extension axis of the detection arm extending from the first beam and an extension axis of the detection arm extending from the second beam are substantially the same axis.

Further, in another aspect, the resonator element according to the application example may be configured to include drive beams including a first beam and a second beam that vibrate in torsional vibration modes and are elongated side by side in a first direction, support parts that couple one ends and the other ends of the first beam and the second beam, detection arms elongated from the respective first beam and second beam in a second direction orthogonal to the first direction in a plan view, wherein, in a drive mode, the first beam and the second beam torsionally vibrate in opposite directions to each other, the respective detection arms vibrate in a normal direction of a plane containing the first direction and the second direction, and the detection arm elongated from the first beam and the detection arm elongated from the second beam vibrate in the same direction as each other, and, in a detection mode, when an angular velocity is applied around the second direction, the detection arms vibrate in the first direction.

Furthermore, in another aspect, the resonator element according to the application example may be configured such that the detection arm of the first beam is elongated toward an opposite side to the second beam side, and the detection arm of the second beam is elongated toward an opposite side to the first beam side.

According to the application example, flexural vibrations in the out-of-plane direction are provided to the detection arms extending from the beams that torsionally vibrate. The rotational movement, i.e., the angular velocity is applied to the detection arms, and the in-plane vibrations are generated by the generated Coriolis force. However, the detection arms themselves include no excitation members, and thus, the mechanical coupling caused by shifts in the detection arm sectional shapes produced by manufacturing performance (variations) is not generated. That is, when no rotational angular velocity is applied, the detection arms may correctly output the angular velocity=0. Therefore, more correct angular velocity detection may be performed.

Further, since the first beam and the second beam torsionally vibrate in the opposite directions to each other, the moment to rotate the support parts are cancelled and the sum of them is zero in the support parts. Therefore, the load in the rotational direction of the support parts may be suppressed and the fixation quality to the package may be stabilized.

APPLICATION EXAMPLE 2

The resonator element according to the application example may be configured such that the torsional vibration modes of the first beam and the second beam have two or more torsional vibration parts within the same beams, and the torsional vibration modes of the adjacent vibration parts are at different phases.

Further, in another aspect, the resonator element according to the above application example may be configured such that each of the first beam and second beam has a first region and a second region in the different torsional vibration modes within the same beam, the detection arms are provided in the respective first region and second region, and, in the drive mode, the detection arm provided in the first region and the detection arm provided in the second region vibrate in opposite directions to each other.

According to the above described application example, in the case where the charges generated by the in-plane vibrations by Coriolis force produced in the detection arms are at different phases, the in-plane vibration modes corresponding to the respective vibration modes are at opposite phases, and, by differential amplification of the detected charges, acceleration components may be cancelled. Thereby, for example, when the resonator element is mounted on a portable apparatus, the acceleration components of vibrations applied to the apparatus and the like may be eliminated and only the angular velocity components may correctly be extracted, and the more correct angular velocity may be detected.

APPLICATION EXAMPLE 3

The resonator element according to the application example may be configured such that the resonator element is made of quartz.

According to the above described application example, a small and thin resonator element advantageous in temperature characteristics may be obtained.

APPLICATION EXAMPLE 4

A resonator according to this application example includes the resonator element according to the application examples.

Further, in another aspect, the resonator according to the application example may include the resonator element according to any one of the application example 1 to application example 3, and a package containing the resonator element.

According to the above described application example, for example, a thin resonator to be an angular velocity sensor that detects rotation having a rotational axis in an in-plane direction may be obtained.

APPLICATION EXAMPLE 5

A physical quantity sensor according to this application example includes the resonator element according to any one of the application example 1 to application example 3.

According to the above described application example, for example, a thin angular velocity sensor as a physical quantity sensor that detects rotation having a rotational axis in an in-plane direction may be obtained.

APPLICATION EXAMPLE 6

An electronic apparatus according to the application example includes the resonator element according to any one of the application example 1 to application example 3.

According to the above described application example, an electronic apparatus exerting the effects according to the above application examples may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments according to the invention will be described with reference to the drawings.
Embodiment 1

Figure 1:
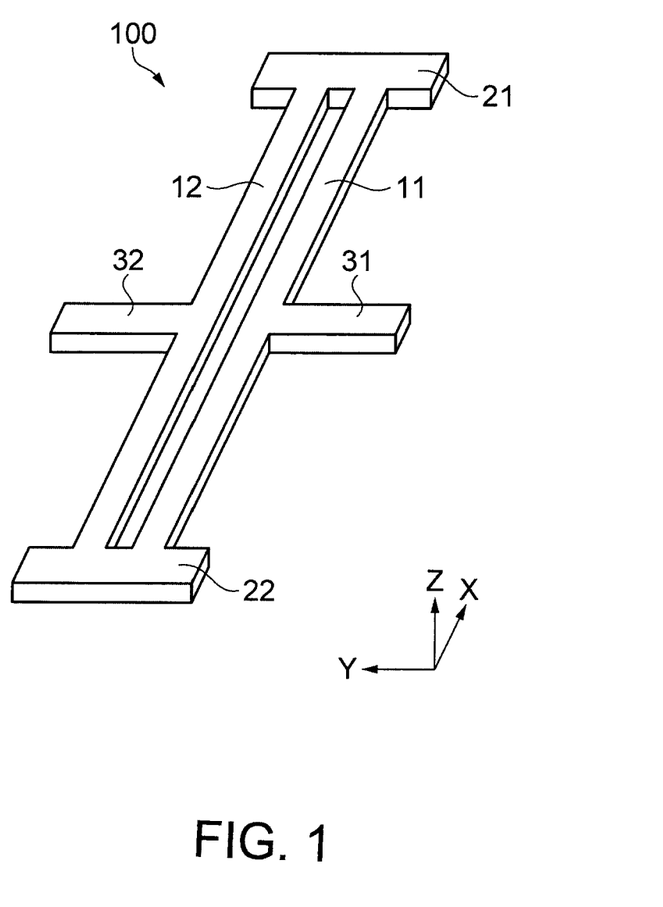
FIG. 1 is a schematic perspective view showing the first embodiment.

FIG. 1 is a schematic perspective view showing a resonator element of the first embodiment. A resonator element 100 is formed by a piezoelectric material, for example, and, in this embodiment, the resonator element 100 formed by a quartz substrate will be explained. The resonator element 100 is formed by a Z-cut substrate obtained by cutting out the X-axis and the Y-axis of the X-axis called the electric axis, the Y-axis called the machine axis, and the Z-axis called the optical axis of quartz.

The resonator element 100 includes a first drive beam 11 and a second drive beam 12 extending in parallel to the X-axis direction (the first axis), a support part 21 and a support part 22 provided on both ends of the respective drive beams 11, 12, a first detection arm 31 and a second detection arm 32 extending (elongated) from the centers of the respective drive beams 11, 12 toward the opposite side to the other drive beam side along the Y-axis direction (the second direction).

On the first drive beam 11 and the second drive beam 12, excitation electrodes that drive vibrations of the first drive beam 11 and the second drive beam 12 in torsional vibration modes. Further, on the first detection arm 31 and the second detection arm 32, detection electrodes that detect vibrations by Coriolis force generated in the respective first detection arm 31 and second detection arm 32 produced when rotation having a rotational axis in the Y-axis direction (an angular velocity around the second direction) is applied to the resonator element 100.

Next, movements of the resonator element 100 will be explained with reference to FIGS. 2A to 3B. The resonator element 100 is a gyro sensor that detects the angular velocity ω having a rotational center axis along the Y-axis as the extension direction of the first detection arm 31 and the second detection arm 32.

The first drive beam 11 and the second drive beam 12 are excited in the torsional vibration modes having torsion center axes in the X-axis direction. Further, the directions of torsional vibrations of the first drive beam 11 and the second drive beam 12 are at different phases (opposite phases). That is, in FIG. 2A, the first drive beam 11 twists clockwise relative to the X (+) direction and the second drive beam 12 twists counter-clockwise relative to the X (+) direction, in FIG. 3A, the first drive beam 11 twists counter-clockwise relative to the X (+) direction and the second drive beam 12 twists clockwise relative to the X (+) direction, and thereby, torsional vibrations are performed by repeating the movements.

Figure 2A:
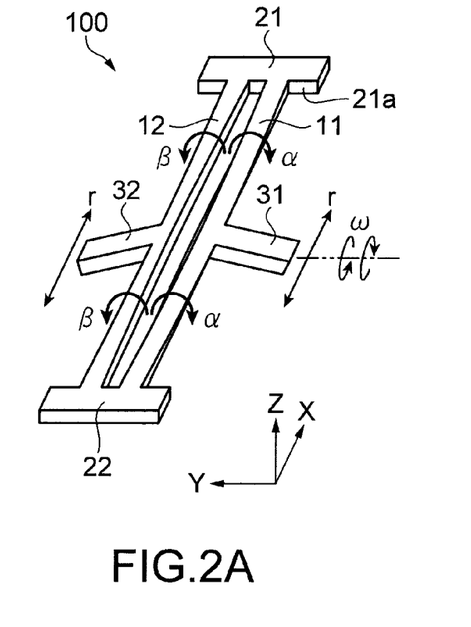
FIG. 2A is a schematic perspective view and FIG. 2B is a front view for explanation of a movement of the first embodiment.
Figure 2B:
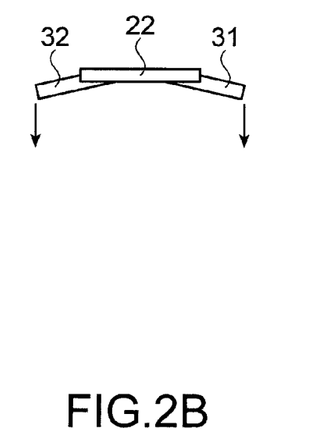
Figure 3A:
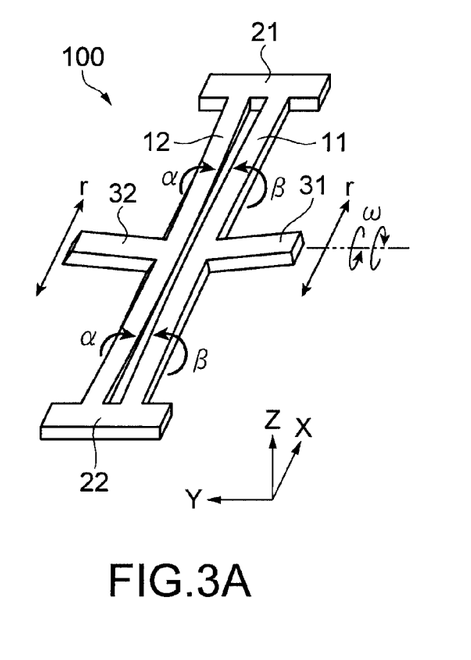
FIG. 3A is a schematic perspective view and FIG. 3B is a front view for explanation of a movement of the first embodiment.
Figure 3B:
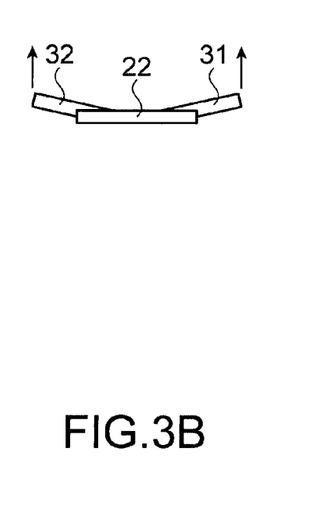

By the torsional vibrations of the first drive beam 11 and the second drive beam 12, the end parts of the first detection arm 31 and the second detection arm 32 displace (vibrate) in the directions of arrows as shown in FIG. 2B and FIG. 3B as front views of the resonator element 100, and the first detection arm 31 and the second detection arm 32 coupled to the first drive beam 11 and the second drive beam 12 substantially perform flexural vibrations in the Z-axis direction. They are vibrating arms that perform so called out-of-plane vibrations.

When the angular velocity ω by the rotational movements having the rotational axes along the Y-axis direction is loaded on there, in the first detection arm 31 and the second detection arm 32, vibrations in the r directions shown in FIGS. 2A and 3A, so-called in-plane flexural vibrations are generated by Coriolis force. The in-plane vibrations r of the first detection arm 31 and the second detection arm 32 are detected and the angular velocity ω is computed from obtained signals.

As described above, an excitation unit (excitation electrodes) is not provided on the first detection arm 31 and the second detection arm 32 themselves and they are driven by the torsional vibrations of the first drive beam 11 and the second drive beam 12, and thereby, the mechanical coupling caused by shifts in the sectional shapes of the first detection arm 31 and the second detection arm 32 due to the driven vibrations of the first detection arm 31 and the second detection arm 32 may be made extremely small. Therefore, signals with less noise may be obtained for the detection of the angular velocity ω by the first detection arm 31 and the second detection arm 32.

Figure 4:
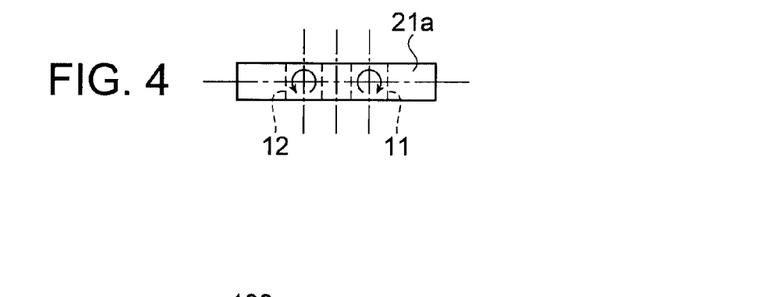
FIG. 4 is a schematic diagram for explanation of moment in a support part of a resonator element.

Further, by vibrating the first drive beam 11 and the second drive beam 12 at different phases, as shown in FIG. 4, on a surface 21a where the support part 21 joins to the first drive beam 11 and the second drive beam 12, opposite torsional moment is applied. Therefore, at the center of the support part 21, moment to rotate the support part 21 is cancelled and the summation becomes zero. Accordingly, the load in the rotational direction of the support part 21 is suppressed, and the fixation quality to the package may be stabilized. Obviously, the vibration leakage of the first drive beam 11 and the second drive beam 12 to the support part 21 may be suppressed. Though not shown in the drawing, the same advantage may be obtained by the same action in the support part 22.

Note that the first detection arm 31 and the second detection arm 32 may be elongated toward inside between the first drive beam 11 and the second drive beam 12. Preferably, the configuration in which the arms are elongated toward the outside of the first drive beam 11 and the second drive beam 12 as shown in the drawing is advantageous for higher detection sensitivity because the first drive beam 11 and the second drive beam 12 may be closely provided and errors of torsional vibration may be smaller in the first drive beam 11 and the second drive beam 12.

Figure 5A:
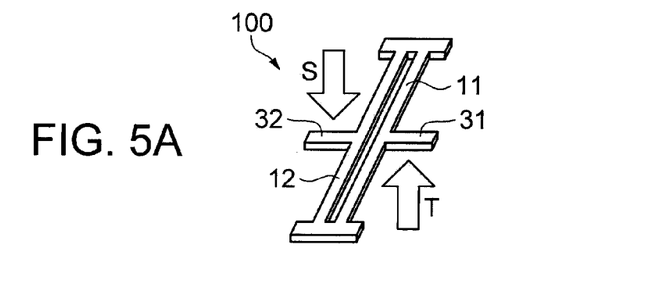
FIG. 5A is a schematic perspective view and FIGS. 5B and 5C are views seen from arrows showing electrode films of the first embodiment.
Figure 5B:
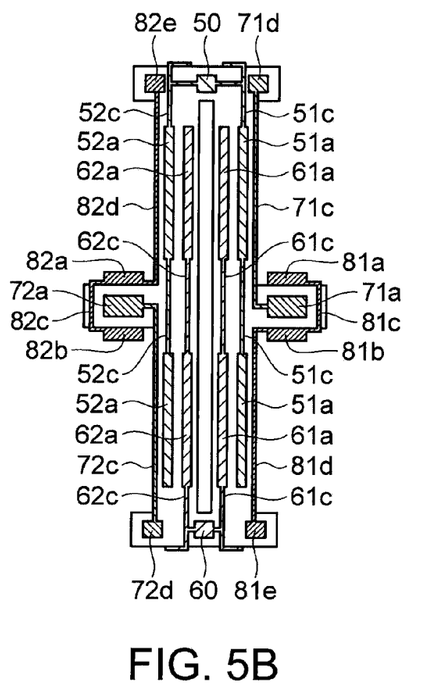
Figure 5C:
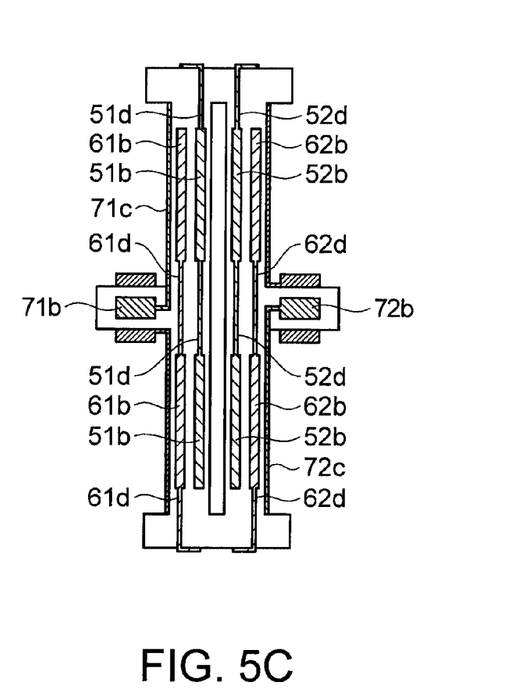

Electrode films formed on the above described resonator element 100 will be explained with reference to FIGS. 5A to 5C schematically showing the arrangement of the electrode films. In a schematic perspective view of the resonator element 100 shown in FIG. 5A, FIG. 5B shows a view seen from a direction of an arrow S (hereinafter, referred to as "front surface") and FIG. 5C shows a view seen from a direction of an arrow T (hereinafter, referred to as "rear surface").

As shown in FIG. 5B, front surface drive electrodes 51a, 61a are provided on the front surface of the first drive beam 11, and front surface drive electrodes 52a, 62a are provided on the front surface of the second drive beam 12. The front surface drive electrodes 51a, 52a are arranged at the outside of the front surface drive electrodes 61a, 62a, and connected to a connection electrode 50 by interconnections 51c, 52c. Further, the front surface drive electrodes 61a, 62a are connected to a connection electrode 60 by interconnections 61c, 62c.

Further, as shown in FIG. 5C, rear surface drive electrodes 51b, 61b are provided on the rear surface of the first drive beam 11, and rear surface drive electrodes 52b, 62b are provided on the rear surface of the second drive beam 12. The rear surface drive electrodes 51b, 52b are arranged at the inside of the rear surface drive electrodes 61b, 62b, and connected by interconnections 51d, 52d. Further, the rear interconnections 51d, 52d are connected to the front interconnections 51c, 52c on the side surfaces of the resonator element 100, and connected to the connection electrode 50.

The rear surface drive electrodes 61b, 62b are connected by interconnections 61d, 62d. Further, the rear interconnections 61d, 62d are connected to the front interconnections 61c, 62c on the side surfaces of the resonator element 100, and connected to the connection electrode 60.

As shown in FIG. 5B, a front surface detection electrode 71a is provided on the front surface of the first detection arm 31, and connected to a connection electrode 71d by a side interconnection 71c. Similarly, a front surface detection electrode 72a is provided on the front surface of the second detection arm 32, and connected to a connection electrode 72d by a side interconnection 72c.

As shown in FIG. 5C, a rear surface detection electrode 71b is provided on the rear surface of the first detection arm 31, and connected to the side interconnection 71c and connected to the connection electrode 71d. Similarly, a rear surface detection electrode 72b is provided on the rear surface of the second detection arm 32, and connected to the side interconnection 72c and connected to the connection electrode 72d.

As shown in FIG. 5B, first detection arm side electrodes 81a, 81b are provided on the side surfaces of the first detection arm 31, connected by an interconnection 81c, and further connected to a connection electrode 81e by a side interconnection 81d. Further, second detection arm side electrodes 82a, 82b are provided on the side surfaces of the second detection arm 32, connected by an interconnection 82c, and further connected to a connection electrode 82e by a side interconnection 82d.

Note that, as a material for the resonator element 100, for example, lithium tantalate, lithium niobate, or the like may be cited as a piezoelectric material other than quartz, and a semiconductor such as silicon may be cited as a material other than the piezoelectric materials.

Further, a driving method of the resonator element 100 may use not only the piezoelectric effect of the piezoelectric material but electrostatic driving by Coulomb force.

They are applied to the following embodiments.

Second Embodiment

In the resonator element of the above described embodiment, the resonator element including one detection arm on one drive beam has been explained, and, as below, a resonator element of an embodiment including plural detection arms on one drive beam will be explained. Here, the resonator element including two detection arms on one drive beam will be explained, and the same actions and advantages may be obtained even with a resonator element including three or more detection arms.

Figure 6:
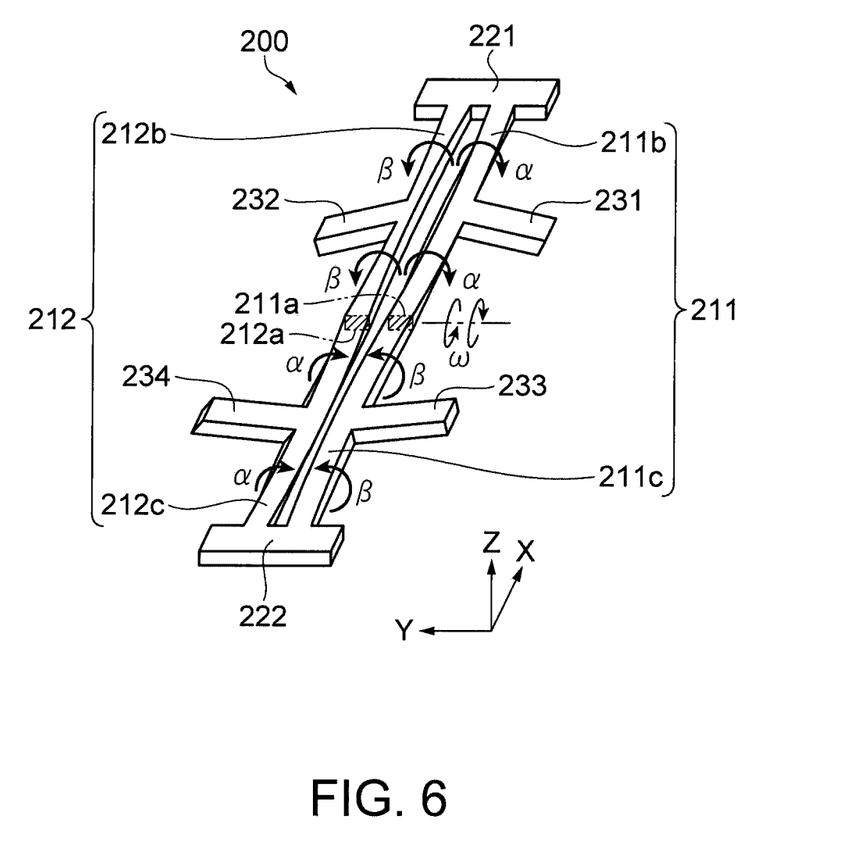
FIG. 6 is a schematic perspective view showing the second embodiment.

FIG. 6 shows a resonator element 200 including two detection arms on a drive beam. Support parts 221, 222 are provided on both ends of a first drive beam 211 and a second drive beam 212. Detection arms 231, 232, 233, 234 respectively extend from the first drive beam 211 and the second drive beam 212. Torsional vibrations of the first drive beam 211 and the second drive beam 212, their details will be described later, are driven in torsional vibration modes at different phases (opposite phases) with virtual surfaces 211a, 212a at the centers of the drive beams in between. Further, the opposed first drive beam 211 and second drive beam 212 are driven in torsional vibration modes at different phases (opposite phases).

That is, as shown in FIG. 6, assuming that the clockwise rotation relative to the X (+) axis direction is α and the counter-clockwise rotation is β, and the drive beams at the support part 221 side (in the first region) from the virtual surfaces 211a, 212a are 211b, 212b, and similarly, the drive beams at the support part 222 side (in the second region) are 211c, 212c, the respective torsional vibration directions are as follows.

If the drive beam 211b at the support part 221 side in the first drive beam 211 is in the torsion direction of α, the torsion direction of β as the opposite direction is provided to the drive beam 211c at the other support part 222 side in the same first drive beam 211. Further, in the second drive beam 212, the torsion direction of β opposite to the drive beam 211b is provided to the drive beam 212b at the support part 221 side of the second drive beam 212, and the torsion direction of α opposite to the drive beam 212b is provided to the drive beam 212c at the other support part 222 side.

That is, the resonator element 200 has the first region and the second region in the torsion directions of the torsional vibration modes different within the same beams (211, 212).

Next, the torsion direction opposite to the above described rotational direction is provided, and the first drive beam 211 and the second drive beam 212 are driven in the torsional vibration modes. Concurrently, in the above described manner, end parts of the detection arms 231, 232, 233, 234 vibrate in the Z direction and the detection arms 231, 232, 233, 234 are driven to perform out-of-plane vibrations.

More detailed explanation will be made with reference to FIGS. 7A to 7C. FIGS. 7B and 7C show states in which parts of the detection arms 231, 232, 233, 234 shown in FIG. 7A displace due to the torsional vibrations of the first drive beam 211 and the second drive beam 212 in the L-L' section and the M-M' section. In FIG. 7B, the ends of the detection arms 231, 232 displace downward in the drawing due to torsions of the drive beams 211b, 212b in the directions shown in the drawing. Concurrently, the other drive beams 211c, 212c are torsionally driven at different phases (opposite phases), and the end parts of the detection arms 233, 234 displace upward in the drawing.

Next, the first drive beam 211 and the second drive beam 212 are driven in the torsion directions opposite to the above described directions, and, as shown in FIG. 7C, the opposite displacement to that in FIG. 7B is provided, and the detection arms 231, 232, 233, 234 are driven in the Z-axis direction to perform out-of-plane vibrations by repeating the movements.

Figure 7A:
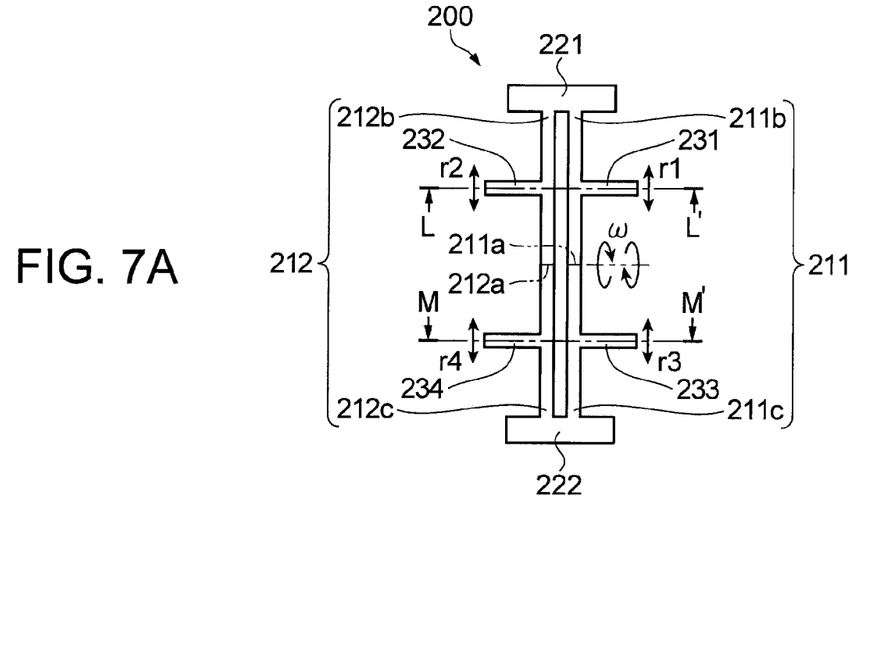
FIG. 7A is a plan view and FIGS. 7B and 7C are detection arm part sectional views for explanation of a movement of the second embodiment.
Figure 7B:
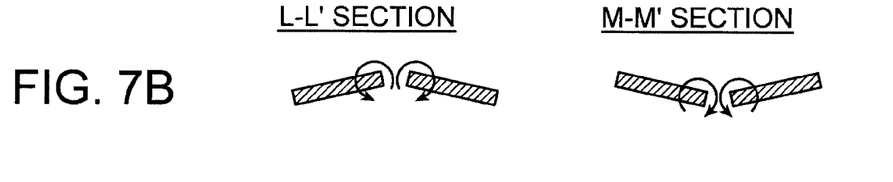
Figure 7C:
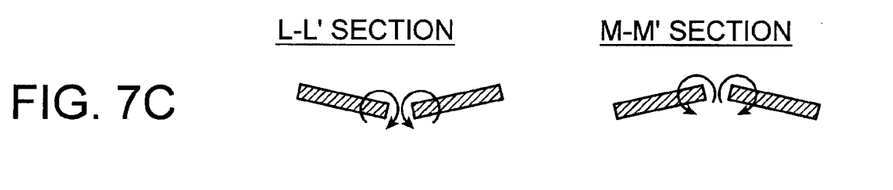

When the angular velocity Ω by the rotational movements having the rotational axes along the Y-axis direction is loaded on there, vibrations in the r1, r2, r3, r4 directions shown in FIG. 7A, so-called in-plane flexural vibrations are generated by Coriolis force in the detection arms 231, 232, 233, 234.

The in-plane flexural vibrations r1, r2, r3, r4 of the detection arms 231, 232, 233, 234 are detected, and the angular velocity ω is computed from obtained signals.

As described above, since the detection arms 231, 232 and the detection arms 233, 234 perform out-of-plane vibrations at different phases (opposite phases, in the opposite directions to each other), the in-plane flexural vibrations r1, r2 and the in-plane flexural vibrations r3, r4 produce flexural vibrations at the opposite phases for the applied angular velocity ω. Therefore, in the case where not only the angular velocity ω but also accelerations in the X-axis direction are applied, by differential amplification of the signals obtained from the detection arms 231, 232 and the signals obtained from the detection arms 233, 234, the accelerations in the X-axis direction may be cancelled out and may be computed into data with only the angular velocity ω component, and thereby, angular velocity detection with the smaller errors may be performed.

The positions of the virtual surfaces 211a, 212a of the first drive beam 211 and the second drive beam 212 are boundary parts between the torsional vibrations at the different phases (opposite phases) as described above, and no torsion moment is generated. However, for example, because of the manufacturing errors of the resonator element 200 and the relatively longer lengths of the first drive beam 211 and the second drive beam 212, like a resonator element 300 shown in FIG. 8, an intermediate support part 323 may be provided in virtual surfaces 311a, 312a parts at the centers of drive beams 311, 312. In the mounting, which will be described later, in a package containing the resonator element 300, in addition to placement parts of support parts 321, 322, the intermediate support part 323 is placed and fixed onto a placement part provided in a position corresponding to the intermediate support part 323, and thereby, a resonator that suppresses breakage due to falling of the resonator element 300 is obtained.

Manufacture of Resonator

Figure 9:
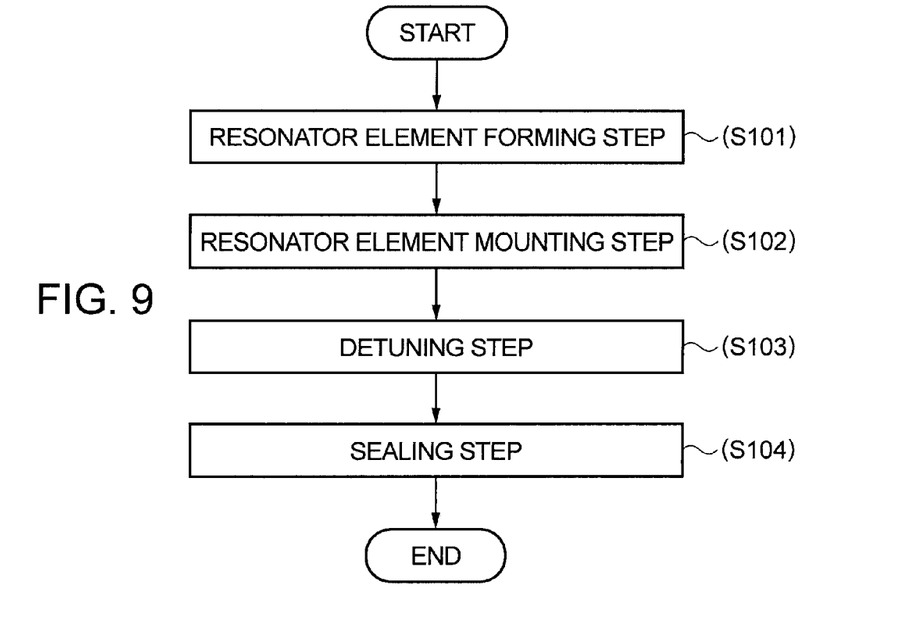
FIG. 9 is a flowchart showing a manufacturing process of the embodiment.

A manufacturing method of an angular velocity sensor as a resonator including the above described resonator element and a package containing the resonator element will be explained. FIG. 9 is a flowchart showing a manufacturing process of the angular velocity sensor, and FIGS. 10A to 10D are sectional views showing a manufacturing method of the angular velocity sensor.

Resonator Element Forming Step

Figure 10A:
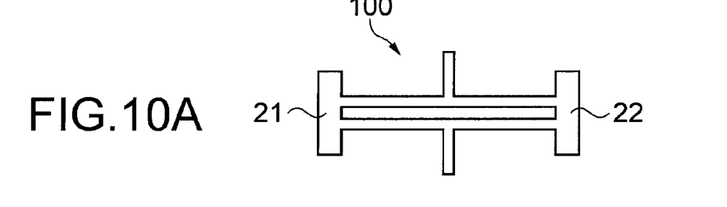
FIGS. 10A to 10D are sectional views showing a manufacturing method of the embodiment.

First, at a resonator element forming step (S101), a resonator element in a planar shape shown in FIG. 10A is formed. As an example, the outer shape of the resonator element 100 is formed by photolithography or etching from a quartz substrate. On the quartz piece with the outer shape formed, an Au film to be electrodes is formed on the surface by a method of evaporation, sputtering, CVD, or the like, and formed into predetermined electrode films by photography or etching. As the electrode films, Cu, Ag, W, or the like may be applied.

Resonator Element Mounting Step

Figure 10B:
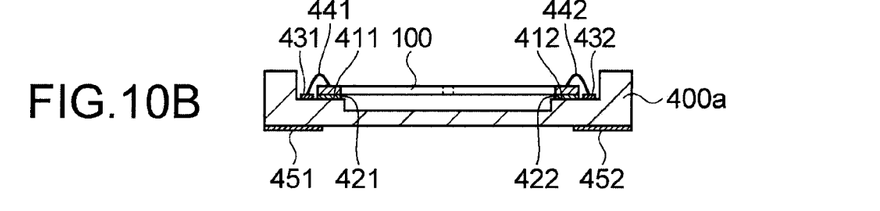

Then, the process moves to a resonator element mounting step (S102). As shown in FIG. 10B, on placement parts 411, 412 formed inside of a package base 400a, the support parts 21, 22 are placed with the connection electrodes (not shown) formed on one surface of the resonator element 100 directed toward the opening side of the package base 400a, and the resonator element 100 is fixedly bonded to the package base 400 by adhesive agents 421, 422.

Then, the connection electrodes of the resonator element 100 and electrodes 431, 432 provided in the placement parts 411, 412 are electrically connected by conducting wires 441, 442, so called wire bonding is performed. The electrodes 431, 432 are electrically connected to external connection electrodes 451, 452 formed on the outside of the package base 400*a* by interconnections (not shown).

Detuning Step

Figure 10C:
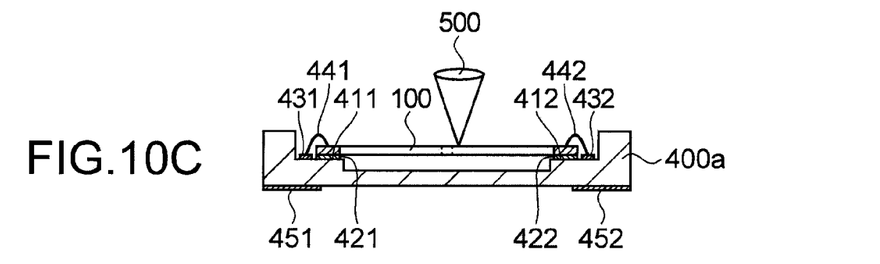

Then, the process moves to a detuning step (S103). As shown in FIG. 10C, the detuning step (S103) is performed while applying a laser beam 500 of YAG laser or the like from a laser device (not shown) to an adjustment film formed by the same Au film as the electrode films (not shown) provided in the resonator element 100 to remove a part of the adjustment film. The frequencies of the detection vibrations (flexural vibration and torsional vibration) in the first detection arm 31 and the second detection arm 32 are set to be lower than a desired frequency by adding the adjustment film in advance. Here, by applying the laser beam 500 to remove the part of the adjustment film, adjustment is performed so that the mass of the adjustment film may be smaller and the frequencies of the detection vibrations of the first detection arm 31 and the second detection arm 32 may be higher. As a method of removing the adjustment film, not only the YAG laser but also an electron beam, reverse sputtering, or the like may be used.

Sealing Step

Figure 10D:
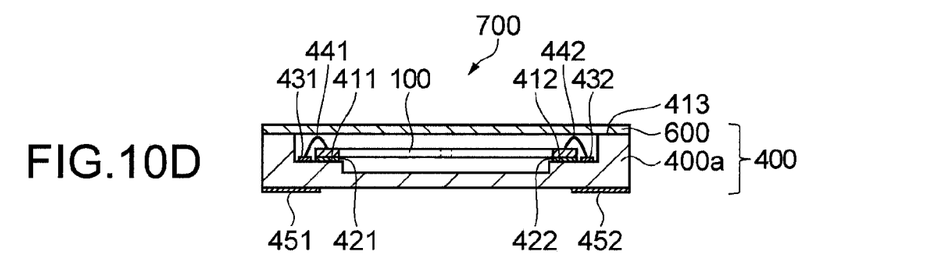

Then, the process moves to a sealing step (S104). At the sealing step (S104), the interior of the package 400 on which the resonator element 100 has been mounted is air-tightly sealed. As shown in FIG. 10D, in the case where a lid body 600 provided on the upper surface of the package base 400*a* is made of a metal such as kovar, the joint part between the lid body 600 and the package base 400*a* is seam-welded and the interior of the package 400 is air-tightly sealed with an inactive atmosphere or reduced-pressure atmosphere.

Further, in the case where transparent glass is used for the lid body 600, low-melting-point glass is provided on a joint surface 413 between the lid body 600 and the package base 400*a*, joined by melting of the low-melting-point glass, and the interior of the package 400 is air-tightly sealed with an inactive atmosphere or reduced-pressure atmosphere. In this manner, an angular velocity sensor 700 is completed.

Note that, in the case where transparent glass is used for the lid body 600, the laser beam may be transmitted through the lid body 600 and applied to the adjustment film of the resonator element 100, and thus, the detuning step may be performed after the sealing step (S104).

Figure 8:
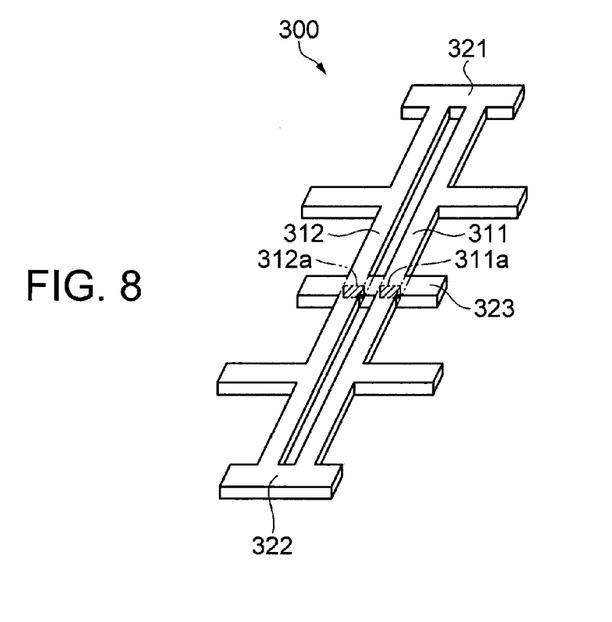
FIG. 8 is a schematic perspective view showing another working example of the second embodiment.
Figure 11:
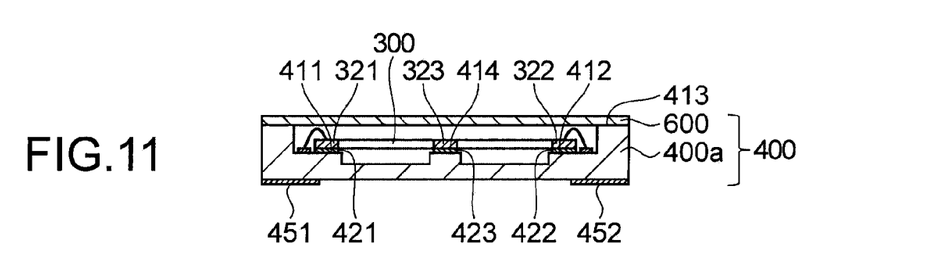
FIG. 11 is a sectional view in the case where another working example of the second embodiment is mounted.

In the above described manufacturing method, in the case where the resonator element 300 including the intermediate support part 323 shown in FIG. 8 is used, a package shown in FIG. 11 is preferably used. That is, the package 400 shown in FIG. 11 includes a placement part 414 in a position corresponding to the intermediate support part 323 of the resonator element 300 in the package base 400*a*, the support parts 321, 322 on both ends of the resonator element 300 are placed and fixedly bonded onto the package base 400*a*, and the intermediate support part 323 is placed and fixedly bonded thereto at the same time. Thereby, breakage due to falling may be suppressed and the angular velocity sensor with high reliability may be obtained.

Note that the package may include a planar package base and a lid body having a recess part, and the like. Further, the package may have recess parts on both of the package base and the lid body.

The angular velocity sensor as a physical quantity sensor includes an oscillation circuit (not shown) as an excitation unit configured to excite the vibrating arms of the resonator element in the torsional vibration modes, and a detection circuit (not shown) as a detection unit configured to process output signals output from vibrations due to generation of the angular velocity (generation of Coriolis force) in addition to the above described component elements.

Note that the detection unit includes a noise cancel circuit etc. in addition to an amplifier, an A/D conversion circuit, an arithmetic processing circuit that converts an amount of detected charge into an angular velocity, etc.

Electronic Apparatus

An electronic apparatus including the above described resonator element will be explained. Note that its illustration will be omitted.

The resonator element may preferably be used as a sensing device or a timing device for an electronic apparatus such as a digital still camera, a video camera, a navigation system, a pointing device, a game controller, a cellular phone, an electronic book, a personal computer, a television, a video recorder, a pager, an electronic organizer, a calculator, a word processor, a work station, a video phone, a POS terminal, and an apparatus having a touch panel, and an electronic apparatus that exerts effects explained in the above described embodiments in any case.

The entire disclosure of Japanese Patent Application No. 2009-284875, filed Dec. 16, 2009 and No. 2010-226379, filed Oct. 6, 2010 are expressly incorporated by reference herein.

What is claimed is:

1. A resonator element comprising:
   drive beams including a first beam and a second beam that vibrate in torsional vibration modes and are elongated side by side in a first direction;
   support parts that couple first ends and second ends of the first beam and the second beam; and
   detection arms elongated from the respective first beam and second beam in a second direction orthogonal to the first direction in a plan view,
   wherein, in a drive mode,
   the first beam and the second beam torsionally vibrate in opposite directions to each other,
   the respective detection arms vibrate in a normal direction of a plane containing the first direction and the second direction, and
   the detection arm elongated from the first beam and the detection arm elongated from the second beam vibrate in a same direction as each other, and
   in a detection mode, when an angular velocity is applied around the second direction, the detection arms vibrate in the first direction.

2. The resonator element according to claim 1, wherein the detection arm of the first beam is elongated toward an opposite side to a side of the second beam, and
   the detection arm of the second beam is elongated toward an opposite side to a side of the first beam.

3. The resonator element according to claim 1, wherein each of the respective first beam and second beam has a first region and a second region in different torsional vibration modes within the same beams,
   the detection arms are provided in the respective first region and second region, and
   in the drive mode, the detection arm provided in the first region and the detection arm provided in the second region vibrate in opposite directions to each other.

4. The resonator element according to claim 1, the resonator element is made of quartz.

5. A resonator comprising:
   the resonator element according to claim 1; and
   a package containing the resonator element.

6. A physical quantity sensor comprising the resonator element according to claim 1.

7. An electronic apparatus comprising the resonator element according to claim 1.

\* \* \* \* \*